March 21, 1967        W. H. JONES        3,309,930

PARTICLE INERTIA PLATFORM

Filed Feb. 1, 1962

*INVENTOR.*
WILLIAM H. JONES

BY

*Richard P. Alberi*
AGENT 3,309,930
PARTICLE INERTIA PLATFORM
William H. Jones, Santa Monica, Calif., assignor, by mesne assignments, to Lear Siegler Inc., Santa Monica, Calif., a corporation of Delaware
Filed Feb. 1, 1962, Ser. No. 170,321
1 Claim. (Cl. 73—516)

This invention relates to particle inertia platforms and more particularly to particle inertia platforms using a container having particles therein and means to detect the forces acting upon the particles.

Gyroscopes and stable platforms now in use comprise a rotating mass having a spin axis, input axis, and output axis or precession axis. The mass is caused to rotate and because of the gyroscopic effects of the rotating mass, any changes applying to the mass about the input axis causes the mass to rotate or exert a force about the output axis. The rotating mass is usually supported by gimbals in order to maintain the spin axis of the rotating mass in proper alignment with movement of the vehicle it is mounted on. Pickoffs are usually provided for detecting the amount of movement of the mass about the output axis or detect the amount of force exerted by the mass about the output axis.

One of the major problems in present day gyroscopes is to reduce the friction in the gimbals so that the gimbals do not exert any forces on the rotating mass, as such forces cause the mass to rotate, and, thereby, provide an error in the pickoffs.

Another major problem in present day gyroscopes is to provide a balanced rotating mass so that it can rotate at great speeds without any tendency towards wobbling, or the like, which obviously causes great errors. The gyroscope is supposed to maintain its position in space and only move about its output axis when displacement or acceleration forces are exerted about the input axis of the gyroscope. The gimballing systems used to support this gyroscope inherently have some friction in them, and, therefore, as stated above, provide an error in the pickoff. The gyroscope, out of necessity, must rotate and likewise the gimbals must have a limited rotational freedom. Therefore, the most accurate gyroscope depends upon the precision with which the gyroscope is produced.

Since the present day gyroscopes require mechanical moving parts, elimination of friction is impossible, and errors in the pickoff devices, although they can be reduced by precision manufacturing methods, are inherent.

It is, therefore, an object of this invention to provide a particle inertia platform.

Another object of the present invention is to provide an extremely simple gyroscope without mechanical moving parts.

Still another object of the present invention is to provide a simple particle inertia gyroscope which is extremely accurate in detecting acceleration.

Other objects and advantages of the present invention will become apparent when the following description is taken in conjunction with the drawings, in which.

Figure 1:
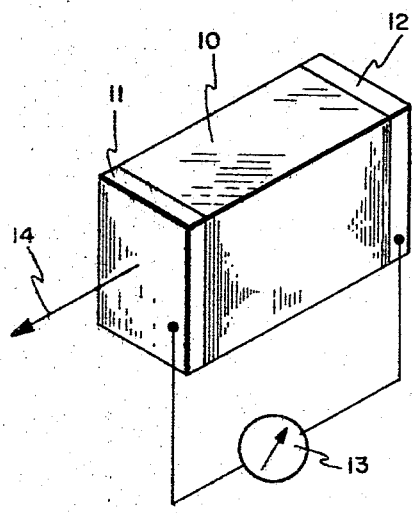
FIG. 1 is a perspective view of the present invention.

Referring to FIG. 1, a body of material 10 has electrodes 11 and 12 connected on either end thereof. The electrons in the material 10 move about in a random fashion and, consequently, the electrical charge on either end of the material 10, as detected by the electrodes 11 and 12, are equal. Electrodes 11 and 12 are electrically connected by way of sensing means 13, such as a meter, for example. Meter 13 and the electrical connection can be replaced by an electrostatic sensor; for example, the type which detects changes in electrical charges down to $10^{-19}$ amperes. Since the charge on both ends of the material 10 is equal, the meter 13 does not register any difference in electrical charges. When the material 10, along with the electrodes 11 and 12, are subjected to an acceleration force, for example, in the direction indicated by arrow 14, the electrons, due to their mass and inertial effects of the acceleration, are moved toward the electrode 12. This leaves a segment of material 10 adjacent to electrode 11 deficient in electrons and, therefore, positively charged relative to the charge on the other end of material 10. This difference in potential is measured by the electrostatic meter 13. The difference in electrical charge on either end of the material 10 is a function of the component of the acceleration in the direction indicated by arrow 14.

Figure 2:
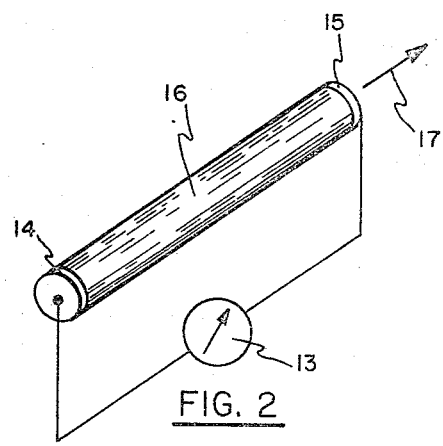
FIG. 2 is a perspective view of a second embodiment of the present invention.

Referring now to FIG. 2, a similar device is set up, only the material is in a circular shape, and it is to be noted that the diameter of the material is considerably enlarged for purposes of explanation. For example, the diameter can be the size of the electrical wire which is connected to the meter 13. In this case the electrodes 14 and 15 on either end of the rod 16 are merely the ends of the electrical connection to the meter 13. When the material 16 is accelerated in the direction, as indicated by arrow 17, the same results occur as described above with reference to FIG. 1. The electrons within the rod 16 tend to move towards the electrode 14, thereby placing a more negative charge on the electrode 14 and a relatively more positive charge on electrode 15, which difference in charge can be measured by the electrostatic sensor 13. The difference measured by the electrostatic meter or sensor 13 can be used in a number of ways once it is amplified by means well known in the art.

When using this invention as a gyroscope having body constructed of a copper rod one-eighth of an inch in diameter and one-half inch long, or a copper one-half inch cube with electrodes of silver attached as described above, accelerations are detected when the apparatus is subjected to acceleration forces. When used in an aircraft for detection of acceleration forces about the yaw axis the electrical detection is amplified by means well known in the art, and sent to the autopilot of the aircraft and used to aid in the control of the aircraft about the yaw axis.

To further increase the difference in electrical charges at either end of the masses 10 and 16, the masses 10 and 16 can be single crystal material such as copper, InSb, or tin, and can be kept at cryogenic temperatures, which temperatures increase the mobility of the electrons when subjected to acceleration forces, thereby increasing the difference in electrical charge at either end of the masses 10 and 16.

Figure 3:
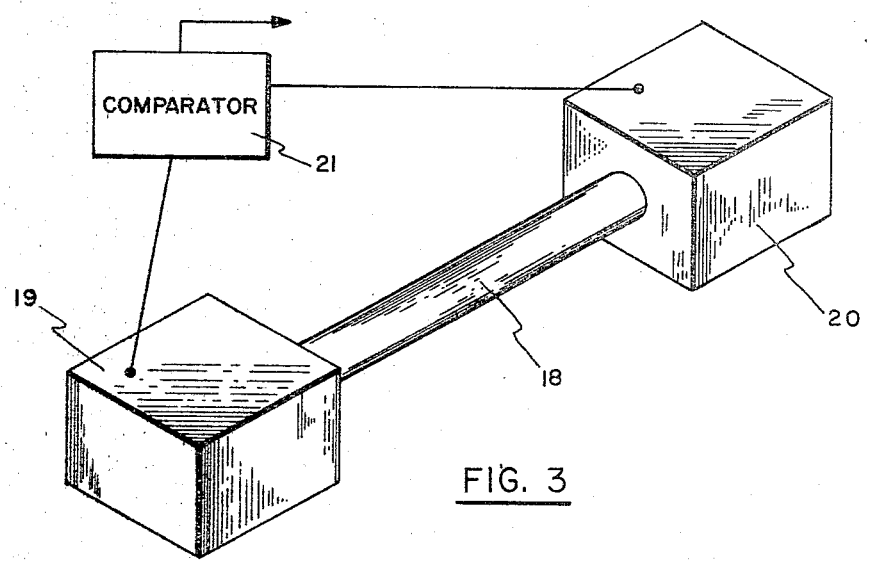
FIG. 3 is a perspective view of a third embodiment of the present invention.

In FIG. 3, tube 18 is filled with a gas. The gas can be radioactive such as krypton 85, antimony triethyl, molybdenum, bromide, or diisoamyl cadmium. When this system is subjected to acceleration forces having a component along the axis of the tube, the atoms move to create an even greater change in concentration at either end of the tube. Geiger mounters 19 and 20 are shown at either end of the tube 18. When the concentration of radioactive gas increases in one end, the radioactivity increases correspondingly, which increase is detected by the Geiger counter at that end. The output of the Geiger counters 19 and 20 is electrically connected to a comparator 21. The comparator 21 compares the output of the two Geiger counters 19 and 20 and emits an electrical signal proportional to the displacement of the radioactive gas in tube 18, which, in turn, is proportional to the component of acceleration of the tube 18 along the axis thereof. The comparator output signal polarity indicates which of the two Geiger counters 19 or 20 is detecting greater radioactivity. The output of the comparator 21 can be amplified and then used again in the autopilot of an aircraft to control an aircraft about a given axis.

Since ions in a gas have a mass which is displaced by acceleration forces, the gas in tube 18 can be an ionized gas such as neon, argon, or sodium. Then, instead of using Geiger counters 19 and 20, Langmuir probes, well known in the art, are used to detect the difference of concentration of the atoms at either end of the tube when the tube is subjected to acceleration. The gas can be ionized in the conventional manner by subjecting the gas to a radio frequency field or a direct current discharge.

The present invention, therefore, provides for a means of sensing the acceleration of a body whether it is a solid body or a gas-filled container without any mechanical moving parts. The following non-limiting examples further illustrate this invention.

EXAMPLE I

A single crystal wafer of InSb was connected with electrodes on either side of it and subjected to acceleration. The difference of charge between the electrodes was measured with an electrostatic sensor. The measured difference was proportional to the acceleration of the wafer and electrodes.

EXAMPLE II

A single crystal wafer of copper was also connected with electrodes on either end of it and subjected to acceleration and a difference of charge between electrodes measured with an electrostatic sensor provided a difference in the electrical charges on either side of the wafer, which difference was proportional to the acceleration of the wafer and electrodes.

Materials which can be used besides copper and InSb for the electrodes are any conductive materials such as, for example, gold and silver.

Although the present invention has been described in detail, the same is by way of example only and is not to be taken by way of limitation, the spirit and scope of this invention being limited only by the terms of the apended claim.

What I claim:

An accelerometer comprising a gas-tight container, a radioactive gas in said container, first and second radioactive detecting means located in spaced apart relation in said container for detecting variations in radioactivity due to variations and density of said radioactive gas upon acceleration of said container in a direction in line with said detecting means, a comparator means connected to the outputs of the first and second radioactivity detecting means wherein the outputs from said first and second detecting means are compared, and a comparator output signal provided indicative of the magnitude and direction of the acceleration along said line.

References Cited by the Examiner

UNITED STATES PATENTS

| | | | |
|---|---|---|---|
| 2,457,620 | 12/1948 | Abraham | 73—517 |
| 2,599,922 | 6/1952 | Kanne | 250—83.6 |
| 2,746,027 | 5/1956 | Murray | 73—517 |
| 2,884,538 | 4/1959 | Swift | 250—106 X |
| 3,011,347 | 12/1961 | Boitnott | 73—517 X |
| 3,015,960 | 1/1962 | Steele | 73—517 |
| 3,065,640 | 11/1962 | Langmuir | 73—517 |
| 3,084,557 | 4/1963 | Von Ahlefeldt | 73—516 |
| 3,105,146 | 9/1963 | Goupil et al. | 250—43.5 |
| 3,120,130 | 2/1964 | Cohen | 73—517 |
| 3,133,219 | 5/1964 | Gunther et al. | 250—106 X |

RICHARD C. QUEISSER, *Primary Examiner.*

SAMUEL LEVINE, *Examiner.*

J. J. GILL, *Assistant Examiner.*